Sept. 14, 1954  R. E. HARTLINE ET AL  2,688,872
APPARATUS FOR FLUID ENTRY LOGGING
Filed June 8, 1949  3 Sheets-Sheet 2

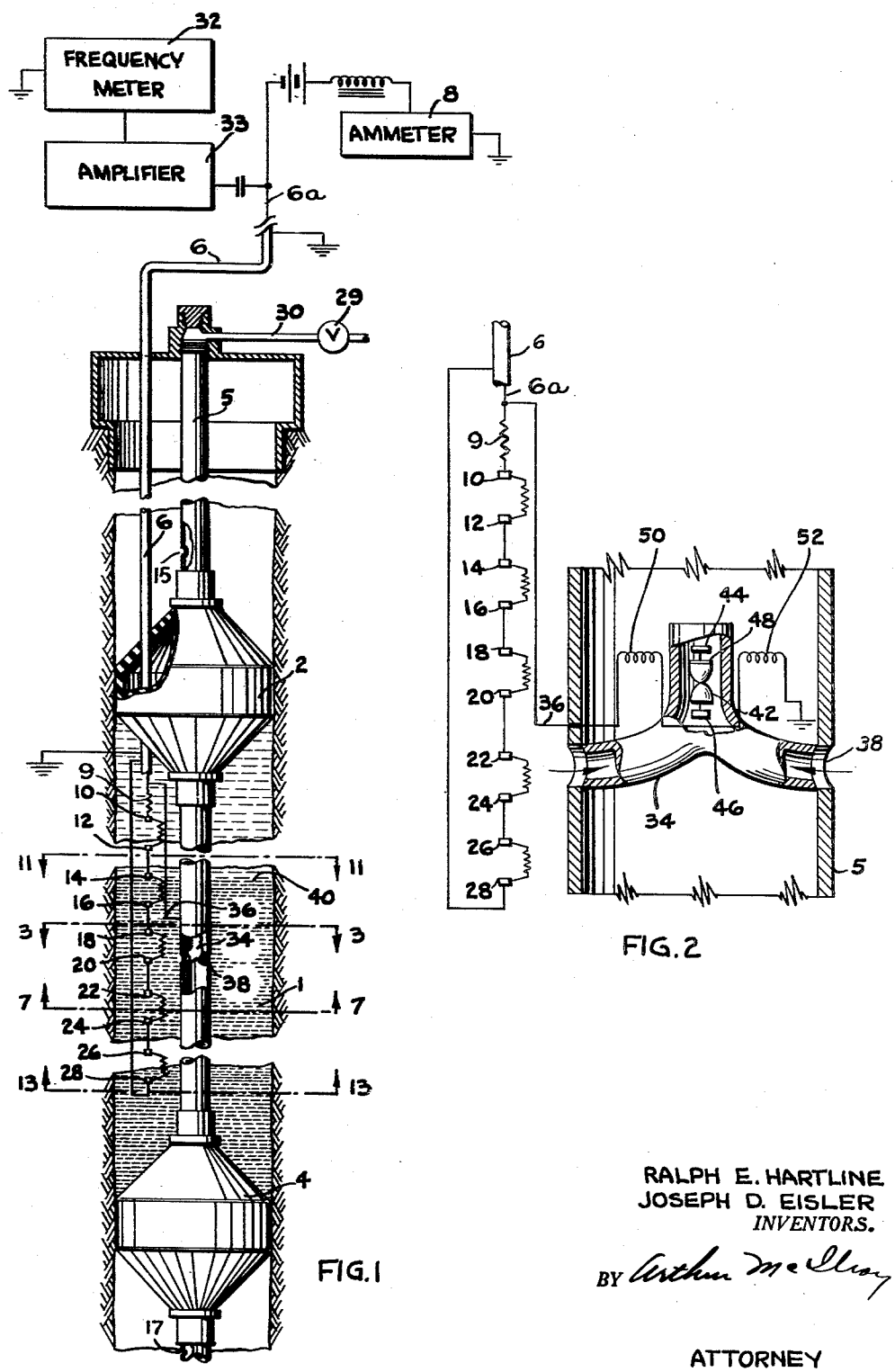

RALPH E. HARTLINE
JOSEPH D. EISLER
INVENTORS

BY Arthur McIlroy

ATTORNEY

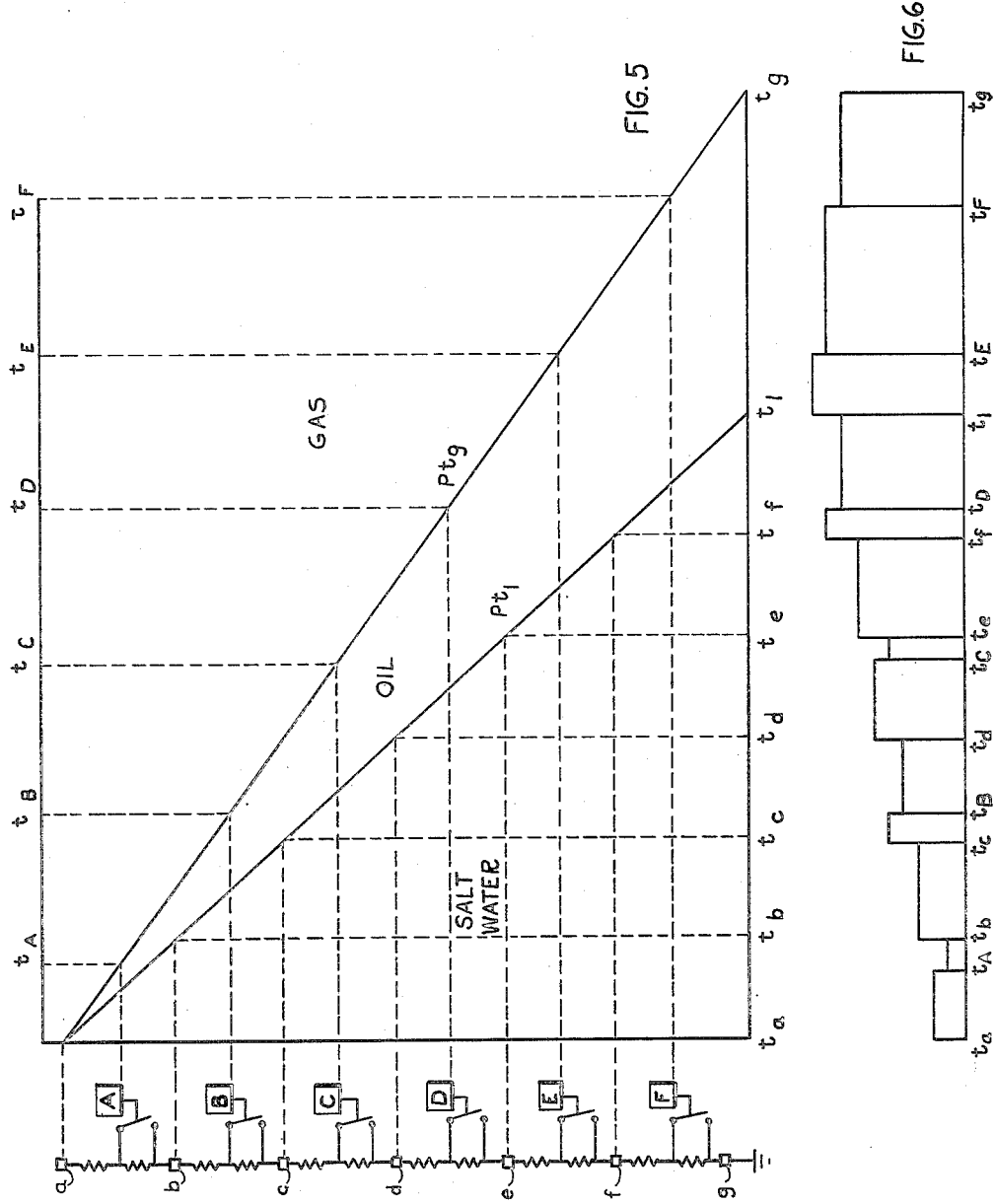

Patented Sept. 14, 1954

2,688,872

UNITED STATES PATENT OFFICE 2,688,872

APPARATUS FOR FLUID ENTRY LOGGING

Ralph E. Hartline and Joseph D. Eisler, Tulsa, Okla., assignors to Stanolind Oil and Gas Company, Tulsa, Okla., a corporation of Delaware Application June 8, 1949, Serial No. 97,764

4 Claims. (Cl. 73—155)

The present invention relates to an apparatus suitable for the identification of well fluids and for measuring their respective rates of flow into a restricted zone of the well bore. More particularly, it is concerned with an apparatus for determining the rate of oil and gas production in a section of the formation from which water is also produced.

In the operation of wells to produce oil and gas, undesired fluids such as, for example, salt water are frequently produced along with the oil. If it is found that the salt water is flowing into the well bore in substantial concentrations, it becomes necessary to separate the salt water from the oil or shut off the flow of the former at its point of entry. When the water source is located, the flow into the well bore can be stopped in any number of ways such as, for example, by means of cementing, pack offs, and the like.

Numerous means have been devised in the past for locating the point of water entry in oil wells; however, these methods, in so far as we are aware, are based chiefly on the principle of shutting down the well, replacing the well fluids with a conditioning liquid such as, for example, fresh water, drilling mud, electrolytes, or the like, and thereafter determining the point or points of salt water entry by means of electrical, potential, or conductivity measurements. The methods and apparatus based on such principles, however, have several serious drawbacks. Thus, in testing wells in accordance with the methods referred to, production must be stopped. Moreover, even after the testing apparatus has been placed in the well bore for use, such equipment is inadequate for determining whether or not oil or gas, or both, are being produced from the same location in the formation as the water, nor can it be employed to determine the rate at which oil and gas are being produced from such a section of the formation.

It is therefore an object of our invention to provide an apparatus for determining the respective volumetric rates of water, oil, and gas production from a restricted zone. It is a further object of our invention to provide an apparatus by the use of which the flow of oil, gas, and water from a specific section can be readily ascertained and to also determine the total production of the water and oil from said zone. It is a still further object of our invention to provide an apparatus whereby the above-mentioned factors can be ascertained under any well condition.

In the accompanying drawings, which illustrate various embodiments of our invention, Fig. 1 is an elevational view, partly in section and partly diagrammatical, of a contemplated well testing assembly.

Fig. 2 is an enlarged sectional view taken between the portion of tubing 5 in Fig. 1, defined by lines 3—3 and 7—7, showing the construction of flow meter 34.

Figs. 5 and 6 are diagrammatical representations demonstrating how the results obtained with an apparatus of the type shown in Fig. 4 may be interpreted.

Figure 3:
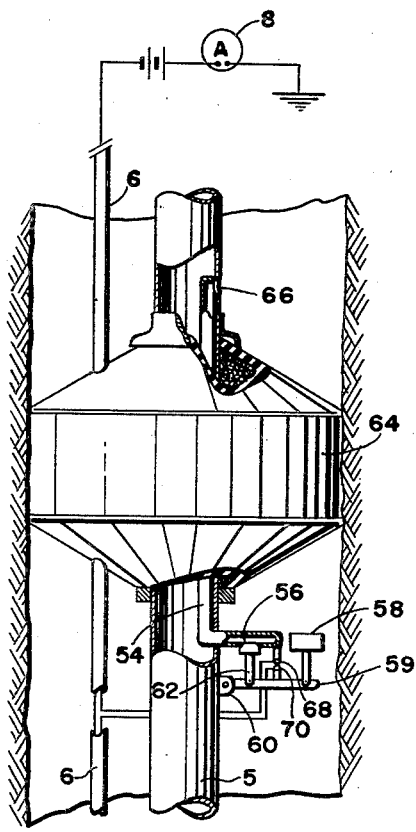
Fig. 3 is an elevational view, partly in section, of a modification of an upper packing element that may be substituted for element 2 of Fig. 1 where wells having a high gas to oil ratio are involved.

In utilizing the present invention for the determination of the rate of oil production from a specific zone within a well bore, the assembly of packers, well tubing, and electrode string is lowered into the bore hole and set by inflating the packers. At the time the packers are set, the test zone should consist essentially of salt water. Small droplets of oil produced by the formation in the packed off area travel upward and collect under the upper packer. The rate of collection of the oil is then determined by observing the increase in resistance of the electrode contacts resulting from their progressive emersion in the oil. The oil-water interface continues to fall until it reaches the exhaust port in the well tubing at which point it remains stationary. In this connection it is of interest to note that in any isolated section producing two immiscible fluids, such as water and oil, a steady state condition can be arrived at only when the fluid interface is in contact with the port at which fluid is withdrawn from the section. If the interface is at any other location, it must be moving toward the exhaust port equilibrium position or the production of one of the fluids must be zero. Total flow of fluids from the restricted zone is indicated by means of a flow meter in the exhaust port. In setting the above-mentioned apparatus in the zone of the well bore to be tested, it is generally desirable to locate the well tubing exhaust port at a point substantially removed from either extremity of the packed off section and preferably near the center of the section. When the exhaust port is set in the bottom of the packed off area, such an arrangement will fail if the assembly is set in a section in which the existing well fluid is oil. Under such circumstances the flow meter indicates the total production, but the fluid interface is initially at its lowermost position and no motion is possible to allow an estimation of the oil production rate. However, in so far as concerns the proper position of exhaust port setting in the restricted zone, sufficient information can be secured by locating the exhaust port at a point in the zone far enough from the interface so that the motion of the latter can be detected by an adequate number of electrodes, or fluid character measuring stations, between the interface and said port, to determine the average speed at which the former approaches the latter.

In Fig. 1 of the drawings there is represented a zone in a well bore wherein the apparatus shown is set at the desired point by inflating packing elements 2 and 4, connected by well tubing 5, to the required pressure. Well tubing 5 is connected through a valve 29 to a line 30, which may lead, for example, to an oil and gas separator. Through packing element 2 a conductor cable 6 is run in a fluid-tight manner to provide electrical communication between ammeter 8 and electrodes 10 to 28 as well as providing electrical contact between frequency meter 32, amplifier 33, and flow meter 34 which connects into the electrode circuit through conduit 36 which is attached to conduit 6a. Flow meter 34 measures only the production entering through exhaust port 38 from the packed off section. Production, preferably at a constant rate, is commenced and the rate of rise or fall of the oil-salt water interface 40 is determined by observing the time at which the interface passes the electrodes. Thus, if the diameter of the bore hole is known, the volumetric rate of production of the fluid not exposed to the exhaust port 38 may be computed. If the well fluid in the test zone is principally salt water at the time of setting the packers, the oil-water interface is high in the zone, initially. The interface then moves downward during the test period if oil production occurs and its rate of fall establishes the oil production rate if the bore hole diameter is known. By determining the total production passing through flow meter 34 and subtracting the production rate of the oil, as determined above, the production rate of the salt water can be ascertained. These measurements may be continued until interface 40 reaches exhaust port 38. When this point is reached, only total fluid production can be measured. The test cycle may be repeated by deflating the packers and allowing entrapped oil to move upward and thereafter resetting the packers in the water phase. Passages 15 and 17 located above packing element 2 and below packing element 4, respectively, in tubing 5 withdraw production, i. e., salt water, gas and/or oil issuing from the unrestricted zone of the well bore. A passage below packing element 4 is especially desirable for preventing the pressure on the lower packer, caused by the accumulation of gas and/or oil production thereunder, from becoming excessive.

Fig. 2 is an enlarged sectional view of a flow meter design suitable for use in the assembly shown in Fig. 1. The production from the packed off section enters flow meter 34 at 38 and thereafter turns vane 42 pivotally mounted on supports 44 and 46. At the top of vane 42 is mounted a permanent magnet 48 which on burning with vane 42 induces a voltage into coils 50 and 52.

The voltage thus generated is then conducted through the electrode circuit via line 36 to frequency meter 32 where the total flow through meter 34 is recorded. Between the point of contact of conduit 36 with conduit 6a and electrode 10 is a resistance element 9 which prevents shorting out of the signal transmitted through conduit 36 in the event the entire electrode string is submerged in salt water.

The apparatus shown in Fig. 1 functions very satisfactorily to determine the rate of production of oil and salt water in wells that produce substantially no gas. However, with wells in which the gas to oil ratio in the packed off section is quite high, the excess gas pressures cause inaccurate determination of the oil production rate as well as of the total oil and water production. In addition to these difficulties, high gas pressures in the packed off zone impose very severe requirements on the packers. In order to reduce the packer load to a minimum and to allow measurement of the more valuable oil without interference from large volumes of gas, packing element 2 of Fig. 1 may be replaced by the device illustrated in Fig. 3 in which a float-actuated valve assembly is shown attached to the lower portion of bypass 54 provided with a seat 56. The buoyant force of the liquid oil applied to float 58 attached to arm 59, which is hingedly mounted to well tubing 5 at 60, functions to close by-pass 54 by means of valve stem 62. The corresponding force exerted by the gas is insufficient to maintain valve seat 56 in the "closed" position; and, as a result, gaseous products from the formation are vented into the well bore above packer 64 through port 66 of by-pass 54. Gaseous products continue to be vented into the well bore until the gas-oil interface rises to lift float 58 bringing valve seat 56 and valve stem 62 again into sealing relationship. By knowing the volume of gas required to cause valve stem 62 to disengage seat 56, the gas production rate can be calculated. Thus, the number of times that the system opens and closes per minute can be readily observed on ammeter 8 which indicates completion and breaking of the electrode circuit through electrical contacts 68 and 70.

Figure 4:
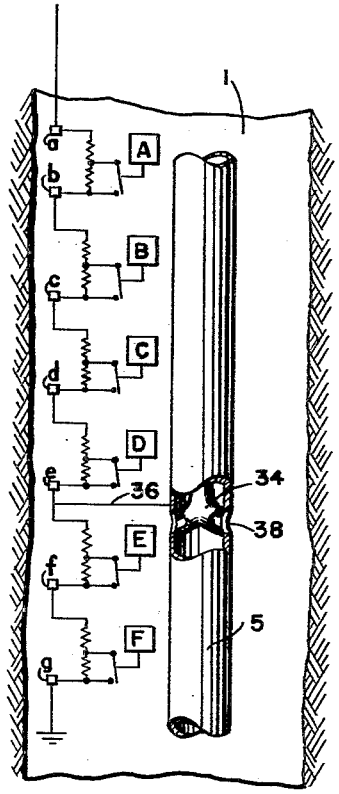
Fig. 4 is a diagrammatical representation taken from a section of Fig. 1, defined by lines 11—11 and 13—13, illustrating another embodiment of our invention suitable for following liquid-liquid and gas-liquid interfaces in the well bore.

In Fig. 4, which is a section from Fig. 1, taken between lines 11—11 and 13—13, an electrode assembly is illustrated suitable for indicating both gas-liquid and liquid-liquid interfaces in the packed off column of fluid. Thus, an electrode string having spaced electrodes a, b, c, d, e, f, and g, with electrical resistance elements connecting each of said electrodes, is lowered into the packed off zone 1 of a well bore along well tubing 5 in a manner such that exhaust port 38, which is an integral part of flow meter 34, is set at a position opposite an intermediate point in the electrode string. Floats A, B, C, D, E, and F, attached to individual shorting switches, are sufficiently insensitive to resist actuation at the oil-salt water interface but will trip the switches to which they are individually attached when the gas-liquid interface falls below a level adequate to support the float. The closing of the switches in this manner transmits a signal to the electrode string which in turn is recorded by ammeter 8. Thus, the time at which the interface passes a particular float or the time interval required for the passage of the interface between adjacent floats spaced at known distances can readily be determined. At the beginning of the test all of the switches are exposed to a single liquid, i. e., salt water or oil. The shorting switches, mentioned above, are normally open when their respective floats are in the position shown. However, as the salt water interface moves downward past electrode $a$, for example, the resistance in the electrode circuit increases by an equal increment of electrical resistance. The gas-liquid interface at the beginning of the test is substantially coincident with the oil-salt water interface, owing to the fact that only a thin film of oil is present at the top of the zone. With continued collection of oil and gas in the upper portion of the test zone, the gas-liquid interface becomes distinct from the oil-salt water interface. As the gas-liquid interface moves on down, float A, for example, is no longer supported and, as a result, the switch cooperating with float A closes, thereby shorting out one-half of the ungrounded series above the oil-salt water interface and thus decreasing the total resistance by an increment equal to one-half of the resistance. In this manner it has now been made possible to identify the time of passage of the oil-salt water interface by means of the resistance change produced at the electrode and to identify the time of passage of the vapor-liquid interface by the resistance change resulting from the shorting of the float actuated switch.

The applicability of the apparatus described immediately above to the solution of fluid entry logging problems may be further illustrated by reference to Fig. 5 which is a graphical treatment of a typical time sequence. Thus, for example, when the apparatus is initially placed in the desired zone, the entire packed off volume consists of salt water. As time progresses, the production from the packed off zone causes the oil-salt water interface to fall along line $Pt_1$ and the interface reaches the exhaust port at a time $t_1$. In a similar fashion the gas-oil interface falls along the line $Pt_g$ to reach the exhaust port at a time $t_g$. During the time of its downward movement, the oil-salt water interface passes electrodes $a$, $b$, $c$, $d$, $e$, $f$, and $g$ at times $t_a$, $t_b$, $t_c$, $t_d$, $t_e$, $t_f$ and $t_g$, respectively, to increase the resistance record by equal increments as shown in Fig. 6 which is a replica of an idealized log below the plot shown in Fig. 5. In a like manner, the gas-oil interface passes floats A, B, C, D, E, and F actuating their respective shorting switches at times $t_A$, $t_B$, $t_C$, $t_D$, $t_E$, and $t_F$ to decrease the electrode resistance by increments of one-half as shown in Fig. 6.

In actual operation only the record of the resistance is available. However, from this record, times $t_a$, $t_b$, $t_c$, $t_d$, $t_e$, $t_f$, and $t_g$ of the passage of the oil-water interface by the known positions of the corresponding electrodes and times $t_A$, $t_B$, $t_C$, $t_D$, $t_E$, and $t_F$, of the passage of the gas-oil interface past the floats can be determined. Since the location of the electrodes and floats is known, the rate of production of salt water, gas, and oil can be individually ascertained. The slope of the line $Pt_g$ gives information for the calculation of the rate of gas production while the slope of the line $Pt_1$ gives information for the calculation of the rate of gas plus oil production. The total production flow meter gives the rate of production of gas, oil, and water. With this information the net production of each component can be computed. It should be kept in mind, however, that the rate of movement of the oil-salt water interface determines the rate of production of the fluid phase to which the well tubing exhaust port is not exposed. To illustrate this point let us assume an assembly of the type contemplated by our invention is set in a well bore with the oil-salt water interface below the exhaust port and that the packed off zone produces no salt water. Under these circumstances the exhaust port will be located in the oil phase and the oil-salt water interface will remain stationary since no salt water is produced to increase the volume thereof. Such a condition interpreted in the graph of Fig. 5 would result in plotting the line $Pt_1$ parallel to the time axis or with zero slope and hence the production rate would be indicated as zero. As the gas production occurs, the float contacts indicate the rate of downward movement of the gas-oil interface. The total flow meter indicates gas plus oil production.

The performance of the apparatus of our invention in instances where it is placed in a packed off volume consisting initially of oil will be found to be similar to those where the packed off volume initially consists of salt water except that the interface develops at the bottom of the test section and moves upward toward the terminal position at the exhaust port.

In test sections where salt water is produced from the top of the packed off section and oil is produced from the lower portion thereof, care should be exercised to prevent such mixed production from passing into the exhaust port of the well tubing. Thus, if the exhaust port were exposed to salt water, any salt water picked up by the oil would be recorded as oil flow. A similar excess in salt water flow would be recorded for the lower oil production picked up by effluent water as the oil migrated upward toward the exhaust port.

It is apparent that various modifications can be made in the above-described method and apparatus without departing from the scope of our invention. Thus, it is not essential in practicing our invention to employ an electrode string having an equal resistance between each pair of electrodes, nor is it necessary to employ means for short circuiting one-half of such resistance. The only factor considered by us to be important, in this regard, is that the amount of resistance employed between a given pair of electrodes at a known location be known, and that the extent to which this resistance is reduced by the specific shorting switch at said location be known. In general, it may be said that the method and apparatus herein set forth are applicable for the determination of the individual volumetric production rates of gas, oil, and water produced in a restricted zone of a well bore under any well conditions.

We claim:

1. An apparatus for determining the rate of flow of fluids in a packed-off zone of a well bore, comprising a well tubing, packing means carried by said tubing, an exhaust port in said tubing, a flow-responsive device in said tubing located adjacent said exhaust port and adapted for use in measuring the total volume of fluid from said zone entering said exhaust port and flowing through said tubing, an electrical circuit having connected therein a pluraltiy of electrodes at selected, spaced intervals vertically disposed along said zone and spaced opposite said exhaust port for determining changes in a fluid characteristic of the well fluids in said zone, means connecting said flow responsive device to said electrical circuit, resistance elements connected between said electrodes, means at the ground surface connected to said circuit for measuring the flow of electrical current through the electrical circuit and said electrodes, which varies with the resistance in the circuit, a source of potential connected to said circuit, and means at the ground surface connected to said circuit for measuring a different characteristic of the current in the circuit which is varied by the flow device, thus indicating the flow of fluids from said zone whereby the rate of movement of an interface along said electrodes can be determined.

2. An apparatus for determining the rate of flow of fluids in a packed-off zone of a well bore, comprising a well tubing, packing means carried by said tubing, an exhaust port in said tubing, a flow-responsive device in said tubing located adjacent said exhaust port and adapted for use in measuring the total volume of fluid from said zone entering said exhaust port and flowing through said tubing, an electrical circuit having connected therein a plurality of series-connected electrodes at selected, spaced intervals vertically disposed along said zone for determining changes in the electrical conductivity of the well fluids in said zone, resistance elements connected between said electrodes, a shorting switch connected across a portion of each of said resistance elements, a liquid level responsive means connected to and actuating each of said switches to decrease the resistance between the respective electrode pairs, a source of potential connected to said circuit, means at the ground surface connected to said circuit for measuring the flow of electrical current through the electrical circuit and said series-connected electrodes which varies with the resistance in the circuit, means connecting said flow responsive device to said electrical circuit, and means at the ground surface connected to said circuit for measuring a different characteristic of the current in the circuit which is varied by the flow device, thus indicating the fluid flow from said zone whereby the rate of movement of an interface along said electrodes can be determined.

3. In an apparatus for determining the rate of flow of fluids in a packed-off zone of a well bore, the combination comprising a well tubing, packing means carried by said tubing, an exhaust port in said tubing, a fluid-responsive device inside said tubing in direct communication with said port and adapted for use in measuring the total volume of fluid from said zone entering said exhaust port and flowing through said tubing, an electrical circuit having connected therein a plurality of series-connected electrodes at selected, spaced intervals vertically disposed along said zone and spaced opposite said exhaust port for determining changes in the electrical conductivity of the well fluids in said zone, resistance elements connected between said electrodes, a shorting switch connected across a portion of each of said resistance elements, and a liquid level responsive means connected to and actuating each of said switches to decrease the resistance between the respective electrode pairs.

4. In an apparatus for determining the rate of flow of fluids in a packed-off zone of a well bore, the combination comprising a well tubing, packing means carried by said tubing, an exhaust port in said tubing, a fluid-responsive device inside said tubing in direct communication with said port and adapted for use in measuring the total volume of fluid from said zone entering said exhaust port and flowing through said tubing, an electrical circuit having connected therein a plurality of series-connected electrodes at selected, spaced intervals vertically disposed along said zone and spaced opposite said exhaust port for determining changes in the electrical conductivity of the well fluids in said zone, resistance elements connected between said electrodes, and a float actuated shorting switch connected across a portion of each of said resistance elements for short circuiting a predetermined portion of the resistance in said circuit between a respective pair of electrodes.

References Cited in the file of this patent

UNITED STATES PATENTS

| Number | Name | Date |
|---|---|---|
| 2,143,962 | Stone | Jan. 17, 1939 |
| 2,218,155 | Russler et al. | Oct. 15, 1940 |
| 2,248,982 | Gillbergh | June 15, 1941 |
| 2,270,141 | Potter | Jan. 13, 1942 |
| 2,295,738 | Gillbergh | Sept. 15, 1942 |
| 2,299,406 | Potter | Oct. 20, 1942 |
| 2,379,106 | Sanders | June 26, 1945 |
| 2,517,603 | Silverman | Aug. 8, 1950 |